No. 810,337. PATENTED JAN. 16, 1906.
G. L. HINSCH.
WHEEL.
APPLICATION FILED MAR. 3, 1905.
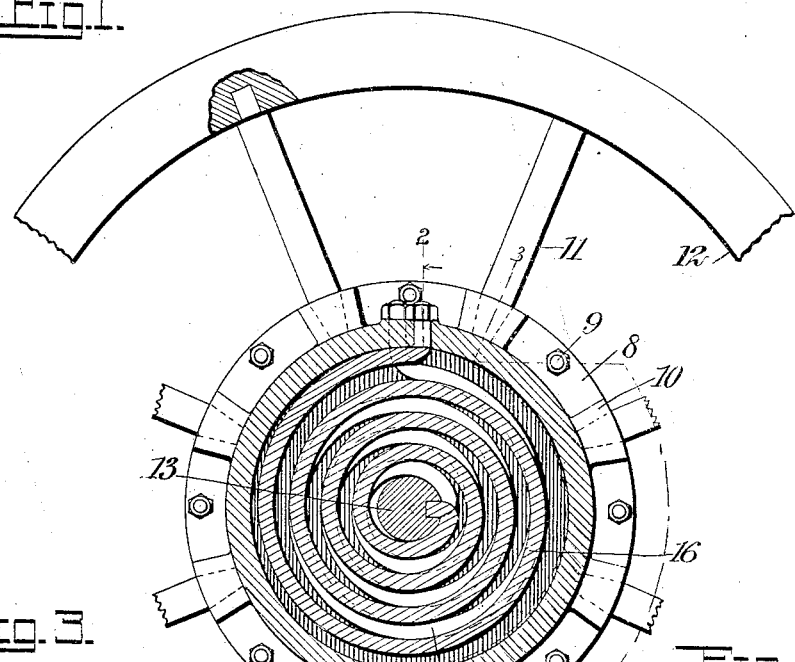
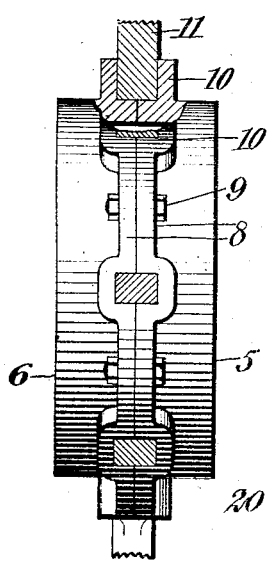
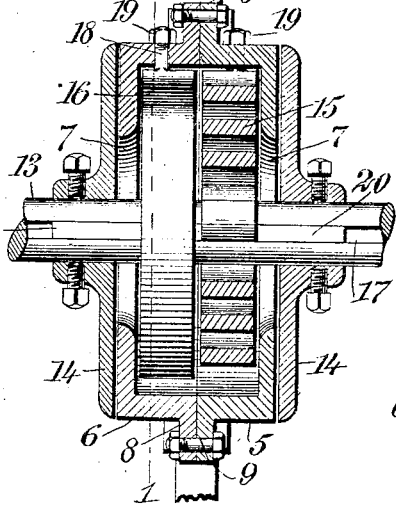
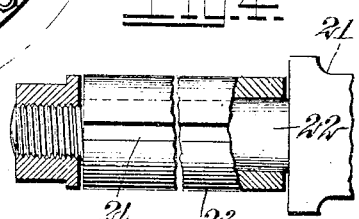
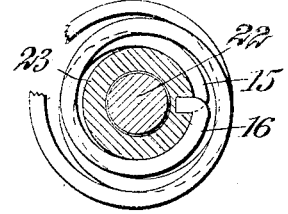
WITNESSES:
INVENTOR
Gustave L. Hinsch
BY
ATTORNEYS

UNITED STATES PATENT OFFICE.

GUSTAVE LAWRENCE HINSCH, OF WAVERLY, IOWA, ASSIGNOR OF ONE-FOURTH TO CHRISTIAN A. FOSSELMAN, AND ONE-FOURTH TO CLAUS C. HOHNSBEHN, BOTH OF WAVERLY, IOWA.

WHEEL.

No. 810,337.	Specification of Letters Patent.	Patented Jan. 16, 1906.

Application filed March 3, 1905. Serial No. 248,272.

*To all whom it may concern:*

Be it known that I, GUSTAVE LAWRENCE HINSCH, a citizen of the United States, and a resident of Waverly, in the county of Bremer and State of Iowa, have invented a new and Improved Wheel, of which the following is a full, clear, and exact description.

This invention relates to improvements in wheels for vehicles—such as motor-cars, automobiles, machinery-wheels, and pulleys, and the like—the object being to provide a wheel with a spring-yielding hub, so as to relieve the vehicle, machinery, or pulley from undue shock and jar while in motion or while making sudden stops or starts and also obviating the use of pneumatic tires on vehicle-wheels.

I will describe a wheel or spring-yielding hub embodying my invention and then point out the novel features in the appended claim.

Reference is to be had to the accompanying drawings, forming a part of this specification, in which similar characters of reference indicate corresponding parts in all the figures.

Figure 1 is a section on the line 1 1 of Fig. 2 of a wheel or spring-yielding hub embodying my invention. Fig. 2 is a section on the line 2 2 of Fig. 1. Fig. 3 is a side view, partly in section, on the line 3 3 of Fig. 1. Fig. 4 is a plan, partly in section, showing a modification; and Fig. 5 is a cross-section of the construction shown in Fig. 4, but showing the springs as attached to the thimble.

The hub of the wheel comprises two sections 5 6, which are of box-like construction, so that when the sections are secured together a hollow hub is formed, the opposite or side walls being provided with openings 7. The sections 5 6 are provided with annular flanges 8, through which fastening-bolts 9 pass, these bolts alternating with socket members 10 for the wheel-spokes 11, the said spokes connecting with a rim 12 of any desired construction. It will be noted that each flange has formed on it one-half of each socket member.

Extended through the hub is an axle 13, which is designed to rotate and carry the wheels thereon, and secured to the axle at opposite sides of the hub are disks 14, which are sufficiently spaced from the hub to permit the movements of the hub relatively to the axle.

Arranged within the hub are coiled springs 15 16, the said springs being wound in opposite directions, the inner ends of the springs being attached to the axle 13 and the outer ends attached to the hub members. While I have shown two springs, it is to be understood that for heavy use a greater number of springs may be used. As a means for attaching the inner ends of the springs to the axle I provide said axle with a channel 17, into which the ends of the springs are turned, as clearly indicated in Fig. 1. The outer ends of the springs have bolt members 18 formed on them, which pass out through perforations in the hub members or sections and are secured by nuts 19. By winding the springs in opposite directions sufficient elasticity is provided to permit motion of the wheel rotatably with relation to the axle; but when the vehicle is once started the wheel may be returned to its normal position relatively to the axle. The springs may be held from lengthwise movement on the shaft or from shifting in the hub by means of keys 20, arranged in the channel 17.

In Figs. 4 and 5 I have indicated a stationary axle 21, on the spindle 22 of which is the rotary part or thimble 23, to which the inner ends of the springs are to be secured in a channel 24, as in the first instance.

As the channel opens outward endwise, as clearly indicated in Fig. 4, by removing the outer disk 14 and the outer key the hub may be readily drawn off when necessary for repairs or other purpose.

Having thus described my invention, I claim as new and desire to secure by Letters Patent—

In a wheel, a hollow hub, consisting of two sections bolted together and having peripheral socket members for spokes, an axle extended through the hub and having a longitudinal channel opening outward at the end, oppositely-wound springs in the hub having their outer ends secured to the hub and their inner ends secured in said channel, and keys in the channel to prevent lateral movement of the springs.

In testimony whereof I have signed my name to this specification in the presence of two subscribing witnesses.

GUSTAVE LAWRENCE HINSCH.

Witnesses:
BURTON E. SWEET,
E. H. SAGER.